United States Patent [19]

Ito et al.

[11] Patent Number: 6,030,907

[45] Date of Patent: *Feb. 29, 2000

[54] COMPOSITE SUBSTRATE FOR PLASTIC REINFORCEMENT, AND FIBER-REINFORCED PLASTIC USING SUCH COMPOSITE SUBSTRATE

[75] Inventors: Haruyasu Ito; Sadao Araki, both of Tokyo; Yoshinobu Yasuda, Kobe; Shuya Tsuji, Hannan, all of Japan

[73] Assignee: Sowa Chemical Co., Ltd., Kobe, Japan

[*] Notice: This patent is subject to a terminal disclaimer.

[21] Appl. No.: 08/895,274

[22] Filed: Jul. 16, 1997

[30] Foreign Application Priority Data

Jul. 29, 1996 [JP] Japan ................................ 8-216714

[51] Int. Cl.⁷ .............................. D04H 1/46; B32B 5/24; B32B 5/28

[52] U.S. Cl. ...................... 442/370; 442/373; 442/374; 442/402; 428/308.4; 428/309.9; 428/314.4; 428/320.2

[58] Field of Search ...................... 442/373, 370, 442/374, 402, 381, 388, 391, 406; 428/309.9, 314.4, 320.2, 308.4

[56] References Cited

U.S. PATENT DOCUMENTS

| | | |
|---|---|---|
| 3,655,471 | 4/1972 | Healy et al. . |
| 3,686,046 | 8/1972 | Crowley . |
| 3,793,414 | 2/1974 | Buff et al. . |
| 3,839,138 | 10/1974 | Kyle et al. ............................. 161/159 |
| 4,426,414 | 1/1984 | Wilkerson . |
| 4,830,905 | 5/1989 | Gulya et al. . |
| 5,866,243 | 2/1999 | Yasuda et al. .......................... 428/235 |

FOREIGN PATENT DOCUMENTS

| | | |
|---|---|---|
| 31 45 547 | 5/1983 | Germany . |
| 33 35 669 | 5/1985 | Germany . |
| 38 11 778 | 11/1988 | Germany . |

OTHER PUBLICATIONS

Patent Abstracts of Japan, vol. 13, No. 76 (M–800), Feb. 21, 1989, JP 63–274518, Nov. 11, 1988.

*Primary Examiner*—Terrel Morris
*Assistant Examiner*—Cheryl Juska
*Attorney, Agent, or Firm*—Oblon, Spivak, McClelland, Maier & Neustadt, P. C.

[57] ABSTRACT

A composite substrate for plastic reinforcement, which comprises a fiber mat and a closed cell foam sheet which are integrated by needling.

17 Claims, 1 Drawing Sheet

COMPOSITE SUBSTRATE FOR PLASTIC REINFORCEMENT, AND FIBER-REINFORCED PLASTIC USING SUCH COMPOSITE SUBSTRATE

The present invention relates to a composite substrate for plastic reinforcement, and fiber-reinforced plastic using such a composite substrate.

It is common to use a resin foam as a core material of a fiber-reinforced plastic (hereinafter referred to simply as FRP) to make the FRP product light in weight and to improve the rigidity, or to further add a heat insulating property thereto.

As a molding method for such an FRP product, a hand lay-up method (a HLU method), wherein fiber mats and resin foams having solvent resistance and good affinity to a resin for molding FRP, are alternately laminated, or a resin transfer molding method (a RTM method), wherein foams are used as wrapped or sandwiched by fiber mats, has heretofore been employed.

However, such a conventional molding method for an FRP product had the following drawbacks.

(1) It required much time and labor for the operation of laminating fiber mats and resin foams alternately, or wrapping or sandwiching foams with fiber mats.

(2) Bonding between the FRP layer and the resin foam depended solely on a chemical bonding force of the resin. Accordingly, if this bonding force was weak, peeling was likely to occur due to an external force or a difference in expansion or shrinkage of the materials for a long period of time, thus leading to deterioration of the properties. Therefore, there was a restriction such that it was necessary to use a resin foam which was highly compatible with the molding resin. Besides, the shear strength of the FRP product was poor.

(3) As a measure to cope with the drawback of the above item (2), it was proposed to use a continuous cell foam sheet of resin, so that an FRP molding resin was made penetrated into the continuous cell foam sheet of resin to improve the bonding force to the FRP layer. However, this proposal was found to have drawbacks that the density increased, and at the same time, the heat insulating property decreased.

It is an object of the present invention to solve the above-mentioned problems of the prior art and to provide a composite substrate for plastic reinforcement, which is light in weight and excellent in rigidity and yet has a heat insulating property and which is suitable for use for molding a fiber-reinforced plastic, and a fiber-reinforced plastic wherein this composite substrate is used.

To accomplish the above object, the present invention provides a composite substrate for plastic reinforcement, which comprises a fiber mat and a closed cell foam sheet which are integrated by needling.

Likewise, to accomplish the above object, the present invention provides a fiber-reinforced plastic comprising a composite substrate for plastic reinforcement, which comprises a fiber mat and a closed cell foam sheet which are integrated by needling, and a resin applied to the composite substrate for plastic reinforcement and cured, wherein the resin is made penetrated to the other side of the substrate via needled portions and cured.

Now, the present invention will be described in detail with reference to the preferred embodiments.

As described above, the composite substrate for plastic reinforcement of the present invention comprises a fiber mat and a closed cell foam sheet. This fiber mat may, for example, be a surfacing mat, a chopped strand mat, a continuous strand mat or a paper, wherein single fibers or strand fibers may be chemically bonded into a sheet by means of a resin powder or a resin emulsion, or they may be bound into a sheet by a mechanical method such as needling or machine-sewing.

Such a fiber mat preferably has a unit weight within a range of from 20 to 1,200 g/m$^2$. Further, preferred ranges of the unit weight depending upon the types of the fiber mats to be used, are as follows from the viewpoint of the economical efficiency (which correspond to the ranges which are commonly obtainable with commercial products).

Surfacing mat, paper: 20 to 100 g/m$^2$

Chopped strand mat, continuous strand mat: 200 to 1,200 g/m$^2$

Fibers constituting such a fiber mat may, for example, be inorganic fibers such as glass fibers, ceramic fibers or carbon fibers, or organic fibers such as polyester fibers.

On the other hand, as the closed cell foam sheet to be used together with the above fiber mat in the present invention, the one having a thickness of from 1 to 50 mm, preferably from 3 to 10 mm may be used. Such a closed cell foam sheet may be made, for example, of an acrylic resin, a vinyl chloride resin, polyethylene, polypropylene, polyurethane, a polyethylene/polystyrene copolymer, an acrylonitrile/butadiene/styrene copolymer (ABS) or rubber. Namely, any material may be used so long as it is a resin capable of presenting a closed cell foam. However, since a resin will be used at the time of molding FRP, the resin for the foam is required to have solvent resistance (the type of solvent resistance varies depending upon the molding resin to be used).

The foaming magnitude of such a closed cell foam sheet may usually be within a range of from 5 to 50 times, preferably from 10 to 30 times. If this foaming magnitude is low, the weight reduction and the heat-insulating effect tend to be low. On the other hand, if the magnitude is too high, the foam is likely to act as a cushion material during formation of FRP, whereby the working efficiency tends to be poor.

Figure 1:
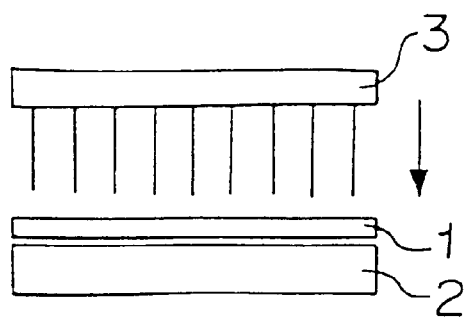
FIG. 1 is a schematic view illustrating one embodiment of a method for preparing the composite substrate for plastic reinforcement of the present invention.
Figure 2:
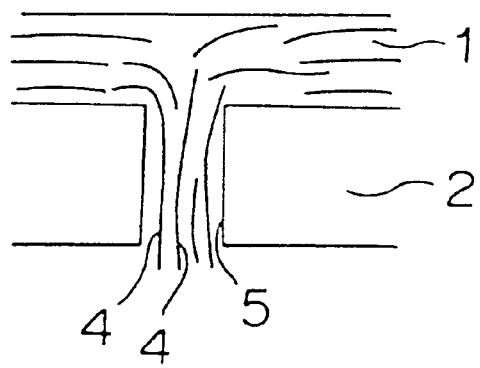
FIG. 2 is a side elevation of the composite substrate of plastic reinforcement of the present invention illustrating a state wherein fibers of the fiber mat pass through needled portions of a closed cell foam sheet.

The composite substrate for plastic reinforcement of the present invention is prepared in such a manner that, for example, as shown in FIG. 1, a fiber mat 1 and a closed cell foam sheet 2 are integrated by needling by means of a needling machine 3, so that, for example, as shown in FIG. 2, at least part of fibers 4 of the fiber mat 1 passes through needled portions 5 in the closed cell foam sheet 2.

Figure 3:
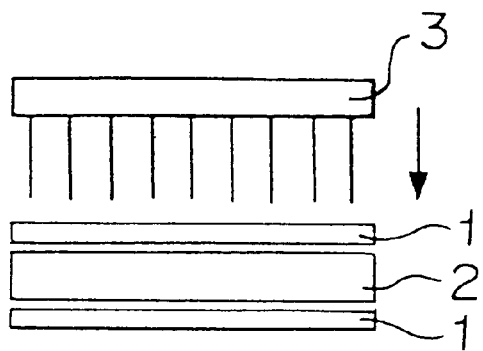
FIG. 3 is a schematic view illustrating another embodiment of a method for preparing the composite substrate of plastic reinforcement of the present invention.

Further, as shown in FIG. 3, a fiber mat 1 may be disposed on each side of the closed cell foam sheet 2, so that the mats 1 and the foam sheet be integrated by needling. One or more fiber mats 1 and closed cell foam sheets 2 may respectively be used for needling. In a case where fiber mats of different types are used in combination, it is advisable to carry out needling by using a mat having a smooth surface like a surfacing mat as the outer layer, so that the FRP surface after molding can be finished smoothly.

In the above needling, the number of needling strokes may, for example, be within a range of from 1 to 100 strokes per 1 cm², preferably from 3 to 50 strokes per 1 cm². When it is required to take the heat insulating property into consideration, the number of needling strokes should preferably be as small as possible.

Further, in order to increase the bonding property, an adhesive may be disposed between the fiber mat 1 and the closed cell foam sheet 2, or the fiber mat 1 and the closed cell foam sheet 2 may be sewn by a suitable thread. In the latter case, the sewing thread may not necessarily be made of the same fiber as the fiber mat.

The composite substrate for plastic reinforcement of the present invention having such a construction, may be produced by preliminarily subjecting the fiber mat 1 and the closed cell foam sheet 2 to needling by a needling machine in a production line, or may be prepared, at an application site, by needling by means of a suitable roller having needling needles attached thereon. The diameter of needled portions (needling holes) in the composite substrate for plastic reinforcement of the present invention thereby obtained, can suitably be changed by adjusting the diameter of such needles. The diameter of needles is usually from 0.3 to 3 mm, preferably from 0.7 to 2.5 mm.

As described above, the composite substrate for plastic reinforcement of the present invention is the one wherein a fiber mat and a closed cell foam sheet are integrated by needling. When this composite substrate for plastic reinforcement is used for molding FRP or for production of an FRP product, it is possible to attain the following effects.

Namely, formation of FRP or production of an FRP product can be made simply by applying an FRP molding resin to the composite substrate for plastic reinforcement of the present invention. Accordingly, the time for setting the closed cell foam and the fiber mat is not required, and the FRP forming time can be shortened, as the resin penetrates via the needled portions during formation of FRP. Accordingly, the operation can be completed quickly as compared with a case where the fiber mat and the closed cell foam sheet are used independently.

The resin to be used for the formation of FRP or the production of an FRP product may be a commonly known liquid thermosetting resin. It may, for example, be preferably an unsaturated polyester resin, a vinyl ester resin, a phenol resin, a methyl methacrylate resin, an epoxy resin, a dicyclopentadiene resin or a furan resin. Among them, an unsaturated polyester resin is particularly preferred from the viewpoint of the impregnation property and the moldability.

The fiber-reinforced plastic of the present invention thus obtained comprises a composite substrate for plastic reinforcement comprising a fiber mat and a closed cell foam sheet which are integrated by needling, and a resin applied to the composite substrate for plastic reinforcement and cured, wherein the resin is made penetrated via needled portions to the other side and cured, whereby bonding between the closed cell foam sheet and the FRP layer depends not only on a chemical bonding force but also on an anchoring effect brought by penetration and curing of the resin for molding FRP at needled portions and penetration of part of the resin into pores in the closed cell foam sheet, so that a strong mechanical bonding will be provided. Accordingly, with respect to the material for the closed cell foam sheet, only solvent resistance may be taken into consideration, and it is unnecessary to select the performance for chemical bonding to the FRP molding resin.

Further, the composite substrate for plastic reinforcement in the fiber-reinforced plastic of the present invention is the one obtained by integrating a fiber mat and a closed cell foam sheet by needling. Accordingly, simply by supplying a resin on the upper fiber mat, the resin will be impregnated through needled portions (holes in the closed cell foam sheet formed by needling) to the lower side and cured, whereby the molding cycle can be facilitated.

In addition, since a closed cell foam sheet is used in the above composite substrate for plastic reinforcement, it is thereby possible to obtain an FRP product having the same level of rigidity as conventional products, and at the same time, by changing the number of needling strokes, a part of the closed cell foam sheet may optionally be substituted by the resin, so that it is possible to optionally adjust the density of the closed cell foam sheet portion, whereby it is possible to obtain an FRP product having optional rigidity.

Further, a part of fibers of the fiber mat is made penetrated through needled portions of the closed cell foam sheet in the fiber-reinforced plastic of the present invention, and the resin is supplied thereto so that FRP is formed in a columnar shape, whereby the compression strength will be improved, and even when subjected to impact, peeling tends to hardly occur at the interface between the FRP layer and the closed cell foam sheet. In order to improve the rigidity and the heat-insulating property, a plurality of composite substrates for plastic reinforcement of the present invention may be used.

Now, the present invention will be described in further detail with reference to Examples. However, it should be understood that the present invention is by no means restricted by such specific Examples.

EXAMPLE 1

Preparation of a Composite Substrate for Plastic Reinforcement

A glass chopped strand mat having a unit weight of 450 g/m² (manufactured by Asahi Fiber Glass Co., Ltd.) was disposed to each side of a 30 times foamed sheet (Softron, tradename, manufactured by Sekisui Chemical Co., Ltd.) of a closed cell foam made of polyethylene and having a thickness of 3 mm and the mats and the foamed sheet were integrated by needling to obtain a composite substrate for plastic reinforcement of the present invention. The number of needling strokes was 22 strokes/cm².

FRP Molding

To the above composite substrate for plastic reinforcement, a resin of the following composition was applied, and FRP molding was carried out.

| | |
|---|---|
| Ortho-type polyester resin (cobalt naphthenate added) | 100 parts |
| Methyl ethyl ketone peroxide | 1 part |

EXAMPLE 2

A composite substrate for plastic reinforcement was prepared in the same manner as in Example 1 except that the 30 times foamed sheet of closed cell foam was changed to the one having a thickness of 5 mm, and FRP molding was carried out in the same manner.

EXAMPLE 3

A composite substrate for plastic reinforcement was prepared in the same manner as in Example 1 except that the glass chopped strand mat was disposed only on one side of the 30 times foamed sheet of the closed cell foam, and FRP molding was carried out in the same manner.

EXAMPLE 4

A composite substrate for plastic reinforcement was prepared in the same manner as in Example 1 except that the glass chopped strand mat was disposed only on one side of the 30 times foamed sheet of the closed cell foam, and the 30 times foamed sheet of the closed cell foam was changed to the one having a thickness of 5 mm, and FRP molding was carried out in the same manner.

EXAMPLE 5

A composite substrate for plastic reinforcement was prepared in the same manner as in Example 1 except that the number of needling strokes was changed to 6.5 strokes/cm$^2$, and FRP molding was carried out in the same manner.

COMPARATIVE EXAMPLE 1

A composite substrate for plastic reinforcement was prepared in the same manner as in Example 1 except that no needling was carried out, and FRP molding was carried out in the same manner.

COMPARATIVE EXAMPLE 2

A composite substrate for plastic reinforcement was prepared in the same manner as in Example 3 except that no needling was carried out, and FRP molding was carried out in the same manner.

COMPARATIVE EXAMPLE 3

A composite substrate for plastic reinforcement was prepared in the same manner as in Example 3 except that no needling was carried out, and instead of the 30 times foamed sheet of the closed cell foam, a 30 times foamed sheet of a continuous cell foam was used, and FRP molding was carried out in the same manner.

COMPARATIVE EXAMPLE 4

Without using the 30 times foamed sheet of the closed cell foam, two glass chopped strand mats having a unit weight of 450 g/m$^2$ (manufactured by Asahi Fiber Glass Co., Ltd.) were overlaid one on the other, and FRP molding was carried out in the same manner as in Example 1.

COMPARATIVE EXAMPLES 5 and 6

Composite substrates for plastic reinforcement were prepared in the same manner as in Comparative Example 1 (this will be designated as Comparative Example 5) and Comparative Example 2 (this will be designated as Comparative Example 6) except that the 30 times foamed sheet of the closed cell foam was changed to the one having a thickness of 5 mm, and FRP molding was carried out in the same manner.

COMPARATIVE EXAMPLE 7

A composite substrate for plastic reinforcement was prepared in the same manner as in Comparative Example 3 except that the 30 times foamed sheet of the continuous cell foam was changed to the one having a thickness of 5 mm, and FRP molding was carried out in the same manner.

Comparative Tests

Various comparative tests were carried out with respect to the FRP products prepared as described above. The results are shown in Tables 1 and 2. The blank spaces in Tables 1 and 2 indicate that no measurements were carried out.

TABLE 1

| | Examples | | | | |
|---|---|---|---|---|---|
| | 1 | 2 | 3 | 4 | 5 |
| | | | Thickness of foam sheet (mm) | | |
| Test items | 3 | 5 | 3 | 5 | 3 |
| Shear strength (kg/25 mm) | 80.7 | 76.7 | — | — | 18.0 |
| Compression strength (kg/cm$^2$) | 83.2 | 84.0 | 89.5 | 91.2 | 29.5 |
| Thermal resistance (m$^2$h° C./Kcal) | 0.085 | 0.135 | 0.080 | 0.130 | 0.092 |
| Rigidity in bending (m) | 0.2 | 0.3 | | | 1.0 |

TABLE 2

| | Comparative Examples | | | | | | |
|---|---|---|---|---|---|---|---|
| | 1 | 2 | 3 | 4 | 5 | 6 | 7 |
| | | | | Thickness of foam sheet (mm) | | | |
| Test items | 3 | 3 | 3 | — | 5 | 5 | 5 |
| Shear strength (kg/mm) | 6.5 | — | — | — | 6.3 | — | — |
| Compression strength (kg/cm$^2$) | 7.8 | 8.2 | | | 6.0 | 6.6 | |
| Thermal resistance (m$^2$h° C./Kcal) | 0.101 | 0.096 | 0.051 | 0.010 | 0.158 | 0.153 | 0.083 |
| Rigidity in bending (mm) | 7.7 | | | 2.2 | 8.1 | | |

It is evident from the above Tables 1 and 2 that as compared with the FRP products of Comparative Examples 1 to 7, the FRP products of Examples 1 to 5 are superior in rigidity and have high heat-insulating properties.

The test methods were as follows.
Shear Strength

A test specimen having a width of 25 mm and a length of 200 mm was prepared from an FRP product, and a notch was imparted in the width direction at the center portion of the upper FRP layer, and a notch was imparted also to the lower FRP layer in the width direction at a position distanced by 25 mm from the notch of the upper layer, whereupon the specimen was pulled in a longitudinal direction by clamping the portions corresponding to 50 mm from both ends, whereby the strength until the upper or lower FRP layer peeled from the foam sheet was measured.

Compression Strength

In accordance with 5.19 of JIS K6911, an FRP product was, as in the form of a large plate, compressed by a compressing head of 25 mm in diameter.

Thermal Resistance

The thermal resistance was determined from the thermal conductivity measured in accordance with JIS A1412 and the measured thickness.

Rigidity in Bending Test

In accordance with JIS K7055, a deflection under a load of 10 kg was measured by using a test specimen having a width of 25 mm.

As described in the foregoing, the composite substrate for plastic reinforcement according to the present invention wherein a fiber mat and a closed cell foam sheet are integrated by needling, solves the problems of the prior art, and it is light in weight and excellent in rigidity and in adhesion between the molded FRP layer and the closed cell foam sheet and thus is suitable for use to mold a fiber-reinforced plastic having a heat insulating property.

Further, with the composite substrate for plastic reinforcement of the present invention, a part of the closed cell foam sheet can freely be replaced by a resin by changing the number of needling strokes, so that the density of the closed cell foam sheet portion can be adjusted. Thus, it has a merit that an FRP product having an optional degree of rigidity can be obtained.

What is claimed is:

1. A composite substrate for plastic reinforcement, which comprises a mat comprising inorganic fibers and a closed cell foam sheet which are integrated by needling said inorganic fibers into said foam sheet.

2. The composite substrate for plastic reinforcement according to claim 1, wherein the fiber mat is disposed on each side of the closed cell foam sheet, and the fiber mats and the closed cell foam sheet are integrated by needling.

3. The composite substrate for plastic reinforcement according to claim 1, wherein the fiber mat is a surfacing mat, a chopped strand mat, or a continuous strand mat.

4. The composite substrate for plastic reinforcement according to claim 1, wherein the fiber mat has a unit weight of from 20 to 1,200 g/m$^2$.

5. The composite substrate for plastic reinforcement according to claim 1, wherein the fibers of the fiber mat are selected from the group consisting of glass fibers, ceramic fibers and carbon fibers.

6. The composite substrate for plastic reinforcement according to claim 1, wherein the closed cell foam sheet is made of an acrylic resin, a vinyl chloride resin, polyethylene, polypropylene, polyurethane, a polyethylene/polystyrene copolymer, an acrylonitrile/butadiene/styrene copolymer, or rubber.

7. The composite substrate for plastic reinforcement according to claim 1, wherein at least a part of the fibers of the fiber mat passes through needled portions in the closed cell foam sheet.

8. The composite substrate for plastic reinforcement according to claim 1, wherein the number of needling strokes is from 1 to 100 strokes per 1 cm$^2$.

9. The composite substrate for plastic reinforcement according to claim 1, wherein an adhesive is disposed between the fiber mat and the closed cell foam sheet.

10. The composite substrate for plastic reinforcement according to claim 1, wherein the fiber mat and the closed cell foam sheet are sewn by a suitable thread.

11. A fiber-reinforced plastic comprising a composite substrate for plastic reinforcement and having two surfaces, which comprises a mat comprising inorganic fibers and a closed cell foam sheet which are integrated by needling said inorganic fibers into said foam sheet, and a thermosetting resin applied to one surface of the composite substrate for plastic reinforcement and cured, wherein the resin is made penetrated to the other side of the substrate via needled portions and cured.

12. The fiber-reinforced plastic according to claim 11, wherein the composite substrate for plastic reinforcement is the one wherein the fiber mat is disposed on each side of the closed cell foam sheet, and the fiber mats and the closed cell foam sheet are integrated by needling.

13. The fiber-reinforced plastic according to claim 11, wherein the resin is made penetrated to the other surface of the substrate via fibers of the fiber mat passing through needled portions and cured.

14. A composite substrate for plastic reinforcement, which comprises an inorganic fiber mat made of glass fibers and a closed cell foam sheet which are integrated by needling said glass fibers into said foam sheet.

15. The composite substrate of claim 14, wherein the closed cell foam sheet is made of polyethylene.

16. A fiber-reinforced plastic comprising a composite substrate for plastic reinforcement and having two surfaces, which comprises an inorganic fiber mat made of glass fibers and a closed cell foam sheet which are integrated by needling said glass fibers into said foam sheet, and a thermosetting resin applied to one surface of the composite substrate for plastic reinforcement and cured, wherein the resin is made penetrated to the other surface of the substrate via needled portions and cured.

17. The fiber-reinforced plastic of claim 16, wherein the closed cell foam sheet is made of polyethylene.

* * * * *

UNITED STATES PATENT AND TRADEMARK OFFICE
CERTIFICATE OF CORRECTION

PATENT NO. : 6,030,907

DATED : February 29, 2000

INVENTOR(S): Haruyasu ITO, et al.

It is certified that an error appears in the above-identified patent and that said Letters Patent is hereby corrected as shown below:

On title page, delete "[73] Assignee:" in its entirety and insert therefore:

-- [73] Assignee: SOWA CHEMICAL COMPANY, LTD., KOBE, JAPAN; ASAHI FIBER GLASS COMPANY, LTD., TOKYO, JAPAN--.

Signed and Sealed this

Third Day of April, 2001

Attest:

NICHOLAS P. GODICI

Attesting Officer

Acting Director of the United States Patent and Trademark Office